(12) United States Patent
Kobayashi

(10) Patent No.: US 7,561,192 B2
(45) Date of Patent: Jul. 14, 2009

(54) IMAGE CAPTURING APPARATUS, CONTROL METHOD THEREFOR, PROGRAM, AND STORAGE MEDIUM

(75) Inventor: Taro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 11/672,105

(22) Filed: Feb. 7, 2007

(65) Prior Publication Data

US 2007/0188632 A1    Aug. 16, 2007

(30) Foreign Application Priority Data

Feb. 14, 2006    (JP)    ............................. 2006-037254

(51) Int. Cl.
H04N 5/262    (2006.01)
(52) U.S. Cl. .................................... 348/240.2
(58) Field of Classification Search ............... 348/240.2
See application file for complete search history.

(56) References Cited

U.S. PATENT DOCUMENTS

| 7,319,811 | B2* | 1/2008 | Tojo et al. ...................... 386/96 |
| 7,423,685 | B2* | 9/2008 | Morimoto ..................... 348/347 |
| 7,463,300 | B2* | 12/2008 | Oyama .................. 348/333.12 |
| 2003/0016942 | A1* | 1/2003 | Tojo et al. ...................... 386/46 |
| 2004/0174444 | A1* | 9/2004 | Ishii ........................ 348/240.1 |
| 2005/0046711 | A1* | 3/2005 | Morimoto ................ 348/240.2 |
| 2005/0094018 | A1* | 5/2005 | Oyama .................. 348/333.12 |

FOREIGN PATENT DOCUMENTS

| JP | 2001-045364 | 2/2001 |
| JP | 2001-111880 | 4/2001 |
| JP | 2002-199266 | 7/2002 |
| JP | 2002-330329 | 11/2002 |
| JP | 2003-110903 | 4/2003 |
| JP | 2004-096611 | 3/2004 |

* cited by examiner

Primary Examiner—James M Hannett
(74) Attorney, Agent, or Firm—Cowan, Liebowitz & Latman, P.C.

(57) ABSTRACT

An image capturing apparatus includes an image sensor, a switching unit which switches between the first read mode in which pixel signals within the first range are read out by decreasing the number of pixel signals at the first reduction ratio, and the second read mode in which pixel signals within the second range narrower than the first range are read out without reducing the pixel signals or by decreasing the number of pixel signals at the second reduction ratio lower than the first reduction ratio, and a control unit which controls the switching unit to switch between the first read mode and the second read mode in accordance with the enlargement ratio of the electronic zoom. The control unit controls to change, in accordance with whether the electronic zoom operates toward the telephoto side or wide-angled side, the zoom enlargement ratio for switching a read mode.

10 Claims, 15 Drawing Sheets

IMAGE CAPTURING APPARATUS, CONTROL METHOD THEREFOR, PROGRAM, AND STORAGE MEDIUM

BACKGROUND OF THE INVENTION

1. Field of the Invention

The present invention relates to an electronic zoom technique in an image capturing apparatus such as a digital still camera or video camcorder.

2. Description of the Related Art

Recently, a large number of digital still cameras and digital video cameras using solid-state image sensors such as a CCD and CMOS are under development. Such cameras read out all pixels on an image sensor when capturing a still image, while they thin out and read out horizontal/vertical pixels when capturing a moving image to be framed or recorded. In this way, they maintain a necessary number of pixels and a necessary frame rate.

Under the circumstance, deterioration in image quality caused by thinning out pixels is unavoidable. Deterioration in image quality becomes prominent when electronic zoom is used. Normally, as shown in FIG. 10, electronic zoom is performed by extracting image data corresponding to a desired range of the field angle from image data on the full screen, enlarging the extracted image data, and displaying/recording the enlarged image data on the full screen. The displayed/recorded image has poorer quality than the image before electronic zoom.

A method disclosed in Japanese Patent Laid Open No. 2001-045364 is proposed as an approach to suppress deterioration in image quality.

Unfortunately, in the Japanese Patent Laid-Open No. 2001-045364, the frame rate decreases as the thinning ratio is changed to suppress deterioration in image quality upon electronic zoom. This is inconsistent with an improvement in image quality. Also, since a driving mode is uniquely defined for each thinning ratio, the image quality changes every time the driving mode is switched. A user may feel uncomfortable.

SUMMARY OF THE INVENTION

The present invention has been made in consideration of the above problems, and has as its object to suppress deterioration in image quality upon electronic zoom while preventing any decrease in convenience.

In order to solve the above problems and to achieve the above object, according to a first aspect of the present invention, there is provided an image capturing apparatus which includes an electronic zoom function, comprising an image sensor which photo-electrically converts an object image, a switching unit which switches between a first read mode in which pixel signals within a first range in the image sensor are read out by decreasing the number of pixel signals at a first reduction ratio, and a second read mode in which pixel signals within a second range in the image sensor, that is narrower than the first range, are read out without reducing the pixel signals or by decreasing the number of pixel signals at a second reduction ratio lower than the first reduction ratio, a signal processing unit which generates a first image on the basis of pixel signals within a third range narrower than the first range of pixel signals within the first range read out in the first read mode, and generates a second image on the basis of pixel signals within the second range read out in the second read mode, and a control unit which controls the switching unit to switch between the first read mode and the second read mode in accordance with an enlargement ratio of the electronic zoom, wherein the control unit controls to change, in accordance with whether the electronic zoom operates toward a telephoto side or wide-angled side, a zoom enlargement ratio for switching a read mode by the switching unit.

According to a second aspect of the present invention, there is provided a method of controlling an image capturing apparatus which includes an electronic zoom function, an image sensor which photo-electrically converts an object image, a switching unit which switches between a first read mode in which pixel signals within a first range in image sensor are read out by decreasing the number of pixel signals at a first reduction ratio, and a second read mode in which pixel signals within a second range in the image sensor, that is narrower than the first range, are read out without reducing the pixel signals or by decreasing the number of pixel signals at a second reduction ratio lower than the first reduction ratio, comprising a signal processing step of generating a first image on the basis of pixel signals within a third range narrower than the first range of pixel signals within the first range read out in the first read mode, and generating a second image on the basis of pixel signals within the second range read out in the second read mode, and a control step of controlling the switching unit to switch between the first read mode and the second read mode in accordance with an enlargement ratio of the electronic zoom, wherein in the control step, a zoom enlargement ratio for switching a read mode by the switching unit is controlled to change in accordance with whether the electronic zoom operates toward a telephoto side or wide-angled side.

Further features of the present invention will become apparent from the following description of exemplary embodiments with reference to the attached drawings.

DESCRIPTION OF THE EMBODIMENT

A preferred embodiment of the present invention will be described in detail below with reference to the accompanying drawings.

Figure 1:
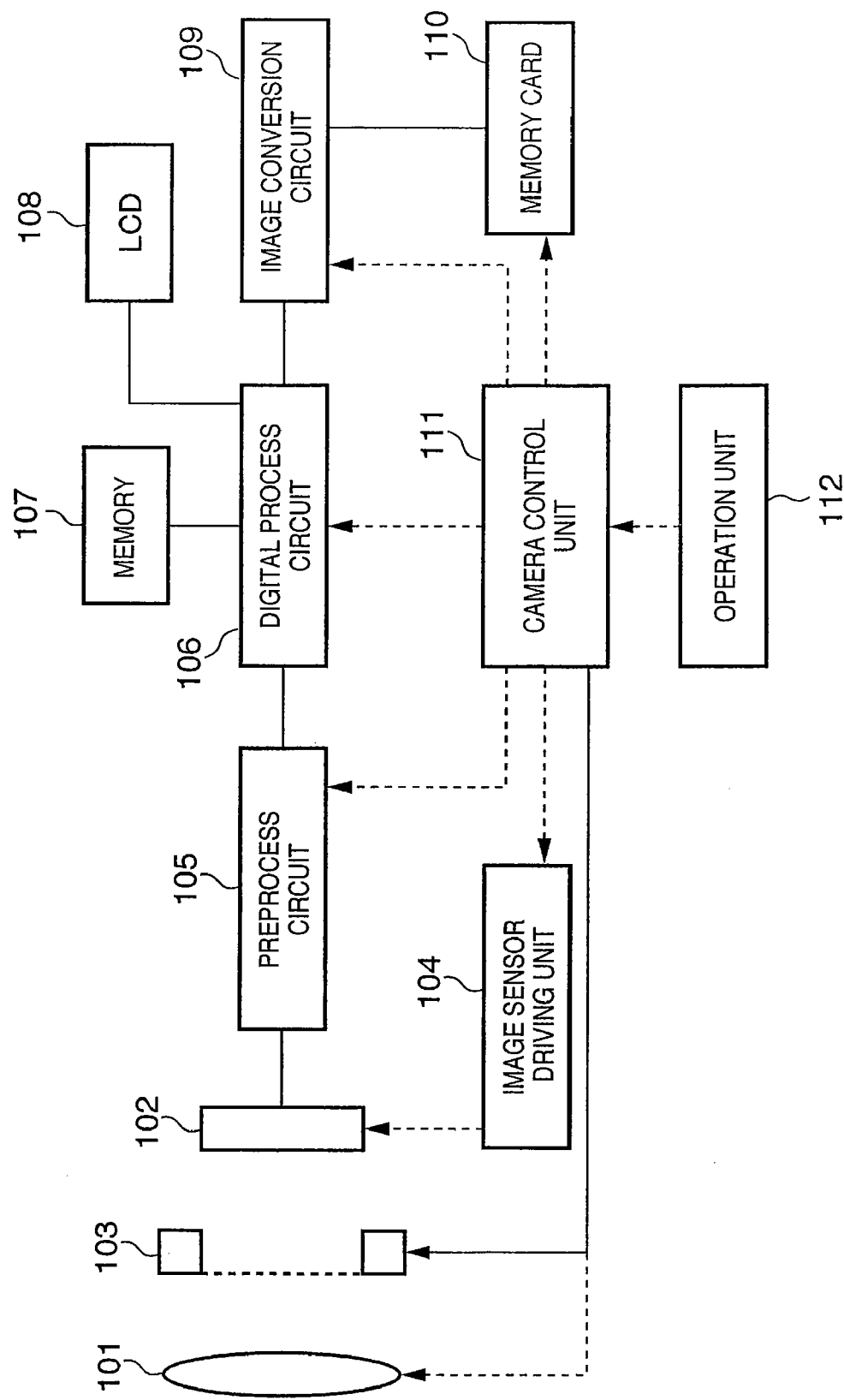
FIG. 1 is a block diagram showing the schematic arrangement of a digital camera according to an embodiment of the present invention.

FIG. 1 is a block diagram showing the schematic arrangement of a digital camera according to an embodiment of the present invention.

An optical system 101 including lenses images an object image on the photo-receiving surface of an image sensor 102. The image sensor 102 photo-electrically converts the object image formed on the photo-receiving surface, and generates an electrical signal. A mechanical shutter 103 is arranged between the optical system 101 and the image sensor 102. Closing the mechanical shutter 103 makes it possible to shield the image sensor 102 from incident light.

An image sensor driving unit 104 which generates an image sensor driving pulse drives the image sensor 102. A preprocess circuit 105 which includes a sample/hold (S/H) circuit, gain amplifier, and analog/digital converter (A/D converter) digitizes the output of the image sensor 102. A digital process circuit 106 receives the digital signal. The digital process circuit 106 executes various kinds of digital signal processing such as gamma processing, color signal processing, edge enhancement processing, and white balance processing. At this time, the digital process circuit 106 writes/reads an image signal in/from a memory 107. It is also possible to output the output of the digital process circuit 106 to an LCD display 108.

The image data processed by the digital process circuit 106 is compressed via an image conversion circuit 109, and written and recorded in a memory card 110. The image conversion circuit 109 has a function of compressing image data from the digital process circuit 106 and outputting the compressed data to the memory card 110, and a function of expanding image data read out from the memory card 110 and outputting the expanded data to the digital process circuit 106.

A camera control unit 111 controls the optical system 101, mechanical shutter 103, image sensor driving unit 104, preprocess circuit 105, digital process circuit 106, image conversion circuit 109, and memory card 110. The camera control unit 111 connects to an operation unit 112 having functions such as a release switch, still image/moving image mode switch, and electronic zoom.

Figure 2:
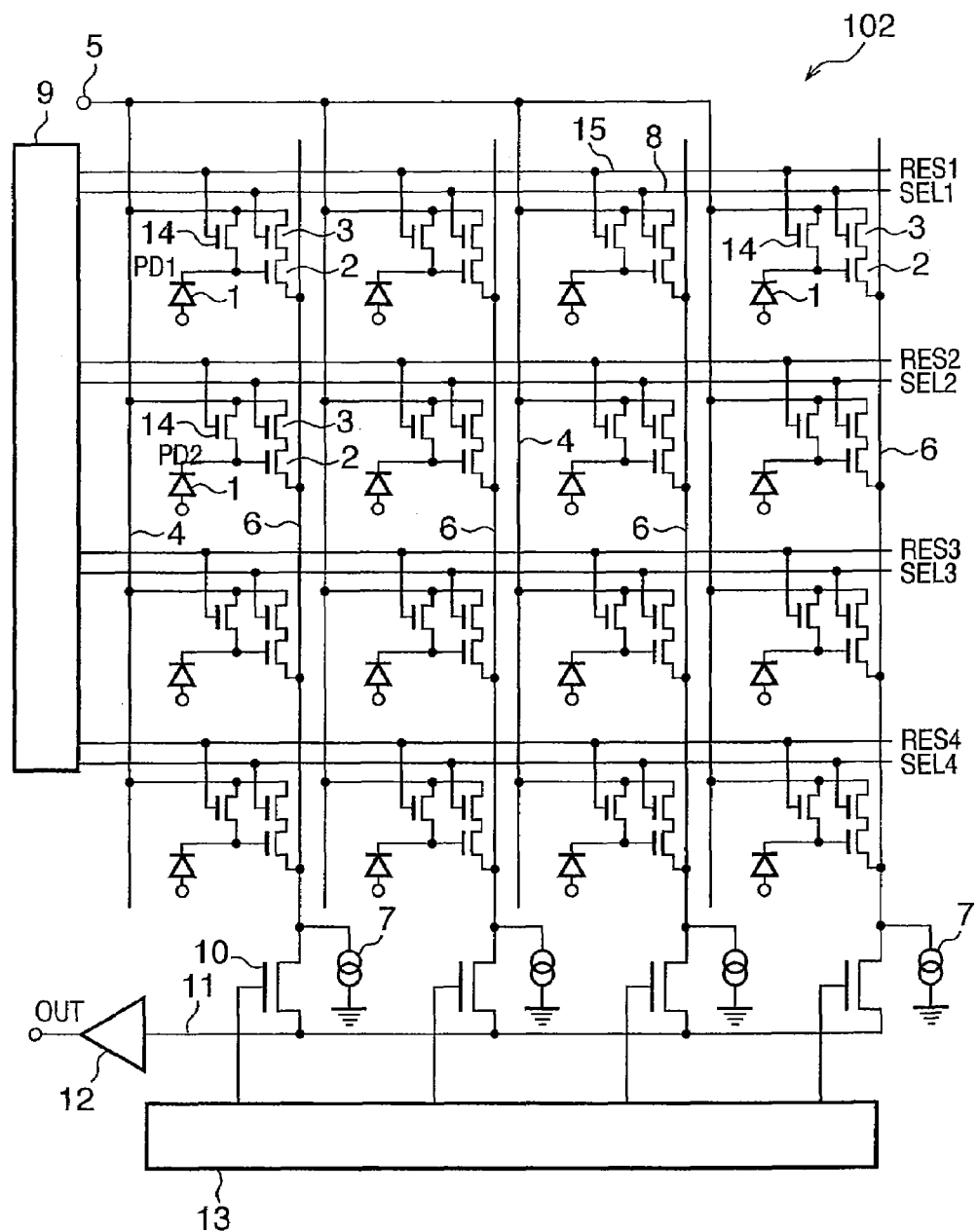
FIG. 2 is a schematic view for explaining an image sensor shown in FIG. 1.

The arrangement of the CMOS image sensor 102 used for the digital camera according to this embodiment will be explained. FIG. 2 is a schematic view for explaining the image sensor 102.

Referring to FIG. 2, each photo-electric conversion element (e.g., photodiode) 1 accumulates charges corresponding to the incident light amount. The photo-electric conversion elements 1 are two-dimensionally arrayed in a horizontal 4×vertical 4 matrix. Although the image sensor 102 has pixels larger in number than horizontal 4 pixels×vertical 4 pixels, it is assumed to have horizontal 4 pixels×vertical 4 pixels here for descriptive convenience.

One end of each photo-electric conversion element 1 connects to the gate of an amplification type source follower input MOS (Metal Oxide Silicon Transistor) 2. The drain of the source follower input MOS 2 connects to the source of a vertical selection switch MOS 3. The source of the source follower input MOS 2 connects to a load current source 7 via a vertical output line 6. The drain of the vertical selection switch MOS 3 connects to a power supply terminal 5 via a power supply line 4. These components form a source follower circuit as a whole. Reference numeral 14 denotes a reset switch. The source of the reset switch 14 connects to the gate of the source follower input MOS 2. The drain of the reset switch 14 connects to the power supply terminal 5 via the power supply line 4.

In this circuitry, the source follower input MOS 2 generates a signal voltage at its gate in accordance with charges accumulated in the photo-electric conversion element 1 of each pixel. Each source follower circuit executes current amplification for the generated signal voltage, and reads out the amplified signal voltage.

The gate of each vertical selection switch MOS 3 is connected to a vertical scanning circuit 9 by a vertical gate line 8. The gate of each reset switch 14 is connected to the vertical scanning circuit 9 by a reset gate line 15. The signal output from the source follower circuit is output to the outside via a vertical output line 6, a horizontal transfer MOS switch 10, a horizontal output line 11, and an output amplifier 12. The gate of each horizontal transfer MOS switch 10 connects to a horizontal scanning circuit 13.

Figure 3:
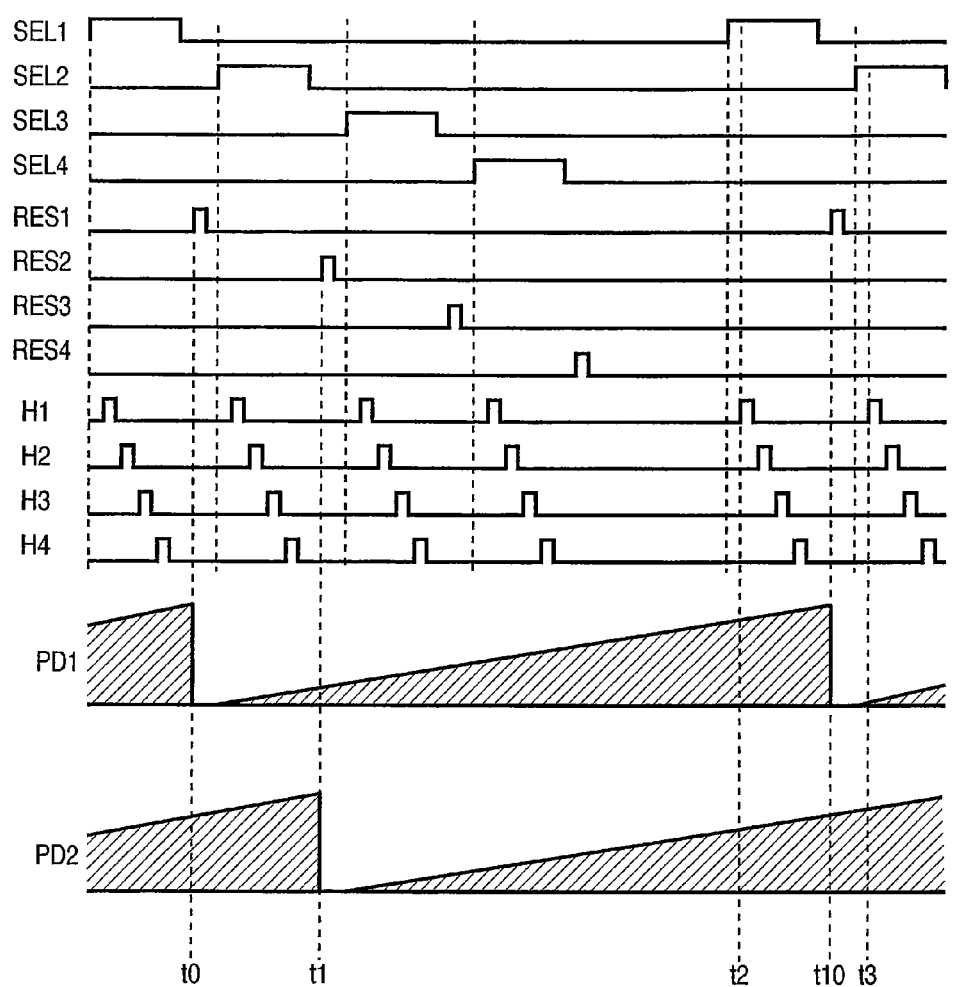
FIG. 3 is a timing chart showing the operation timing in reading all pixels according to the embodiment of the present invention.

The circuit operation in an all-pixel read mode of the digital camera according to this embodiment will be explained with reference to a timing chart shown in FIG. 3.

SEL1 to SEL4 indicate pulses applied to corresponding vertical gate lines 8 in respective pixel rows. RES1 to RES4 indicate pulses applied to corresponding reset gate lines 15 in respective pixel rows. The vertical scanning circuit 9 generates the pulses SEL1 to SEL4 and RES1 to RES4. H1 to H4 indicate horizontal scanning pulses generated by the horizontal scanning circuit 13. The pulses H1 to H4 are applied to the gates of corresponding horizontal transfer MOS switches 10. PD1 and PD2 indicate changes in potentials of photo-electric conversion elements (photodiodes) in the first row and first column and in the second row and first column.

At time t0, the pulse RES1 is set at high level and the reset switch 14 is turned on to reset the photo-electric conversion element PD1. The camera enters an accumulation operation. The source follower input MOS 2 generates a signal voltage at its gate in accordance with the amount of accumulated signal charges. After the elapse of the accumulation time, at time t2, the pulses SEL1 and H1 generated by the vertical scanning circuit 9 and horizontal scanning circuit 13 are applied to corresponding switches 3 and 10. The source follower circuit amplifies a signal from the selected photo-electric conversion element PD1. The amplified signal is output via the output amplifier 12.

The pulses H2 to H4 are sequentially applied to output signals from the photo-electric conversion elements arrayed in the first row. Similarly, the pulses RES2, SEL2, and H1 to H4 control and output signals from the photo-electric conversion elements arrayed in the second row. For example, the photo-electric conversion element PD2 is reset at time t1 and enters an accumulation operation. After the elapse of the accumulation time, at time t3, a signal from the photo-electric conversion element PD2 is output.

The circuit operation in a thinning read mode of the digital camera according to this embodiment will be explained with reference to a timing chart shown in FIG. 4.

Figure 4:
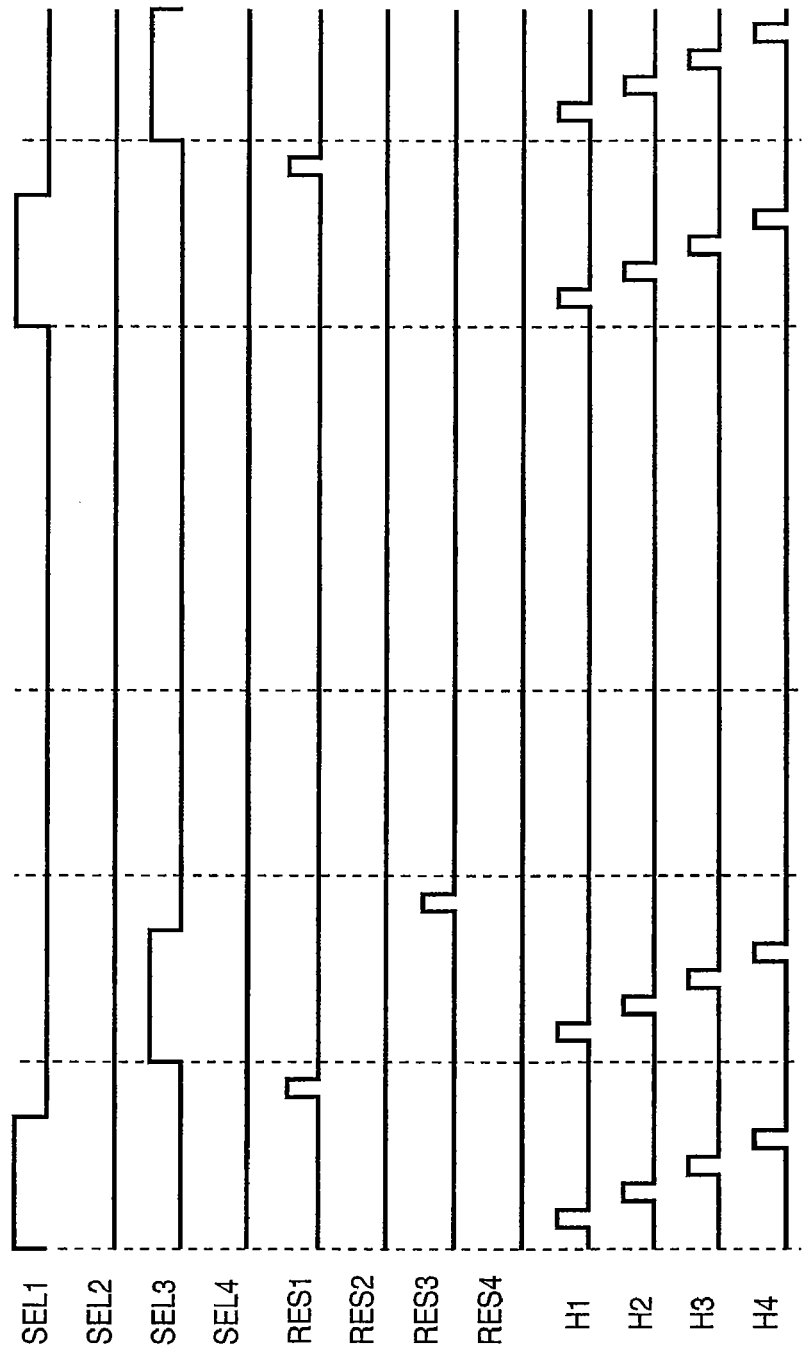
FIG. 4 is a timing chart showing the operation timing in thinning read according to the embodiment of the present invention.
Figure 5:
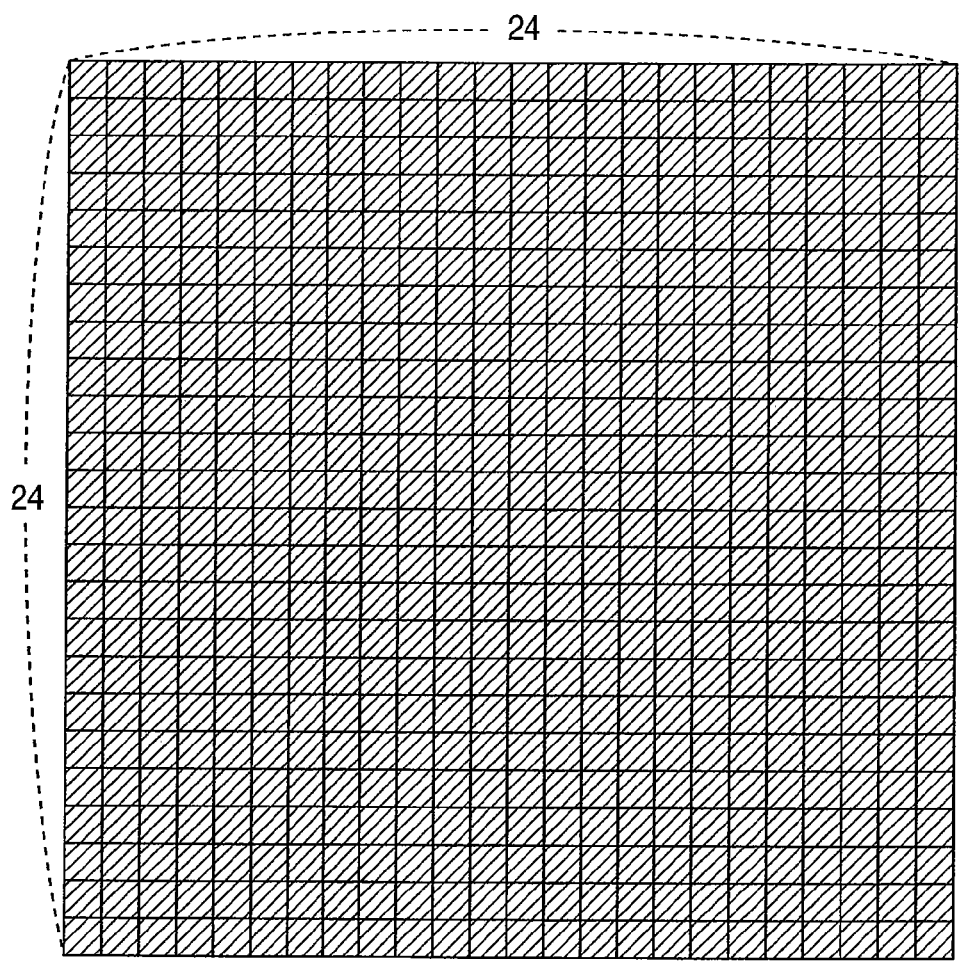
FIG. 5 is a schematic view showing pixels to be read in an all-pixel read mode.

The timing chart shown in FIG. 4 does not indicate an operation for reading out signals corresponding to all pixels, but indicates an operation for partially thinning out and reading out pixel signals.

Referring to FIG. 4, the vertical scanning circuit 9 generates the pulses SEL3 and RES3 after generating the pulses SEL1 and RES1 without generating signals corresponding to the pulses SEL2, SEL4, RES2, and RES4. Signals in the first row and third row are read out by skipping signals in the second row and fourth row. Appropriately setting driving pulses in this way makes it possible to execute thinning read.

Changing the settings of the pulses SEL and RES to be suppressed as described above makes it possible to attain read operations in the first thinning read mode and second thinning read mode according to this embodiment.

FIGS. 5 to 8 show the overviews of pixels to be read out in the all-pixel read mode, first thinning read mode, second thinning read mode, and third thinning read mode which are obtained by the above driving operations. In FIGS. 5 to 8, a hatched unit square represents a pixel to be read, and a bold line represents the field angle to be read.

In fact, pixels form a Bayer array in which R (red), G (green), and B (blue) pixels are periodically laid out. In this embodiment, however, a set of four pixels in a Bayer array is regarded as one pixel for descriptive convenience to omit the concept of a color filter.

In this embodiment, for example, the number of pixels in an all-pixel read mode is assumed to be 24 pixels in the horizontal direction and 24 pixels in the vertical direction. The field angle at this time is assumed to be 1.0×.

Figure 6:
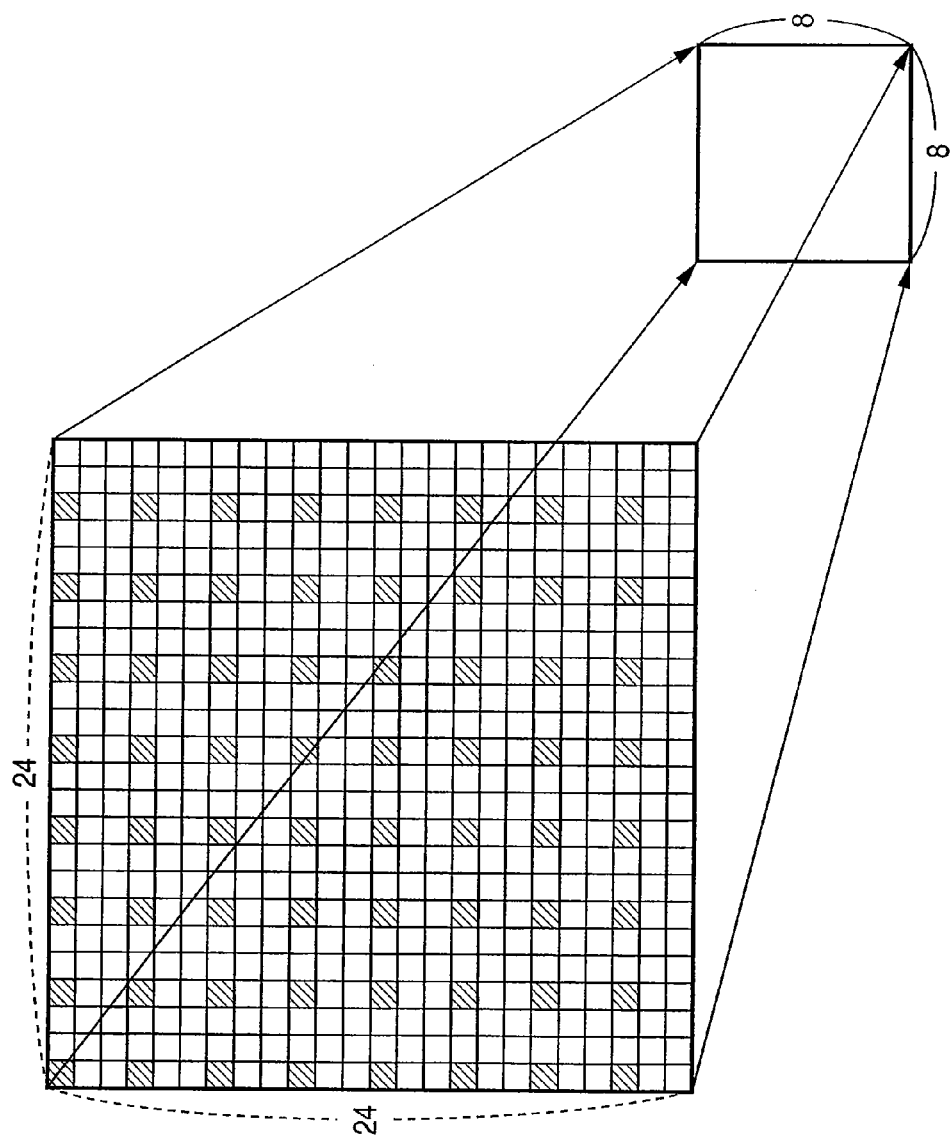
FIG. 6 is a schematic view showing pixels to be read in the first thinning read mode according to the embodiment of the present invention.

In the first thinning read mode, as shown in FIG. 6, horizontal 8 pixels and vertical 8 pixels are read at the entire field angle. The field angle is 1.0×. Two out of three pixels are skipped in each of the horizontal and vertical directions, so the thinning ratio is 1/3.

Figure 7:
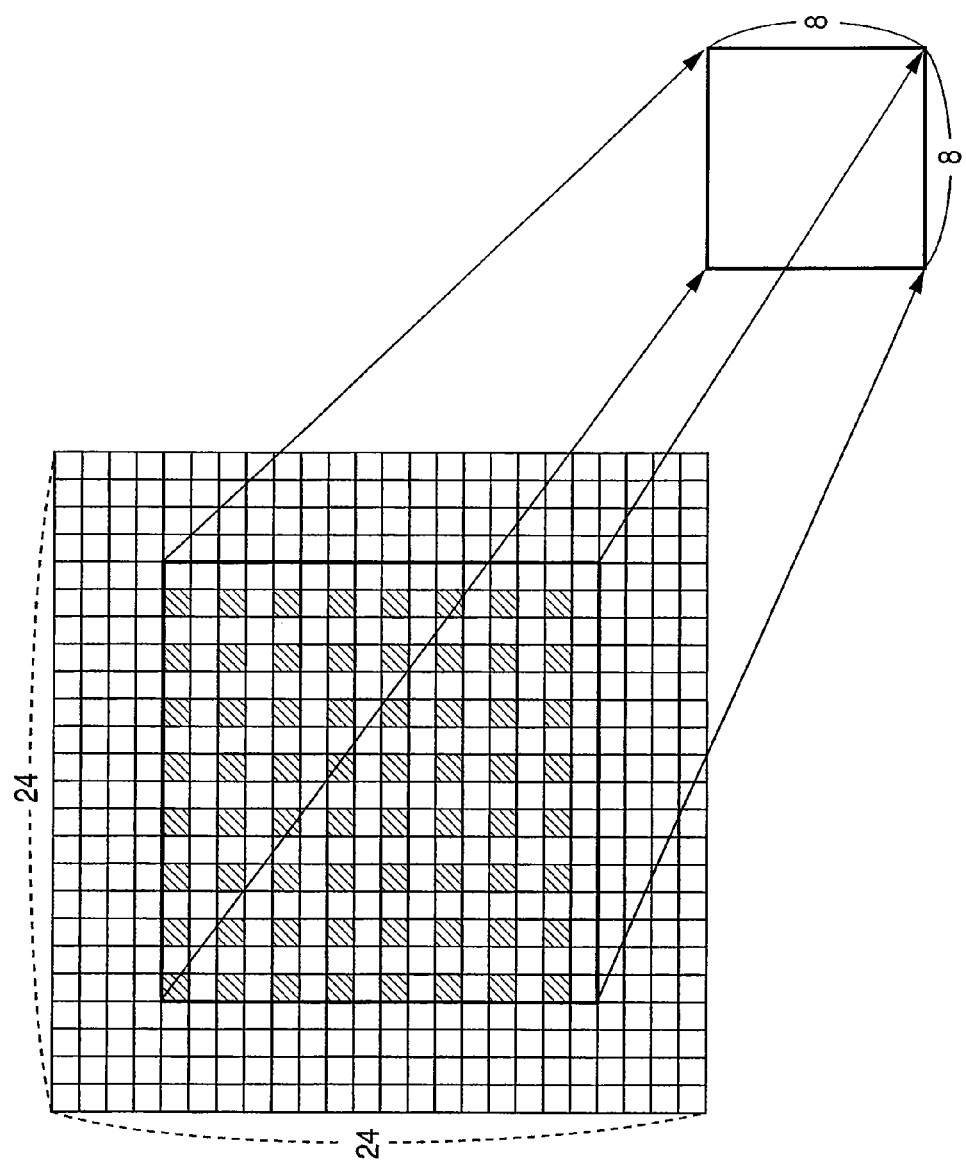
FIG. 7 is a schematic view showing pixels to be read in the second thinning read mode according to the embodiment of the present invention.

In the second thinning read mode, as shown in FIG. 7, horizontal 8 pixels and vertical 8 pixels are read at 2/3 the entire field angle in the vertical and horizontal directions. The field angle is 1.5×. One out of two pixels is skipped in each of the horizontal and vertical directions, so the thinning ratio is 1/2.

Figure 8:
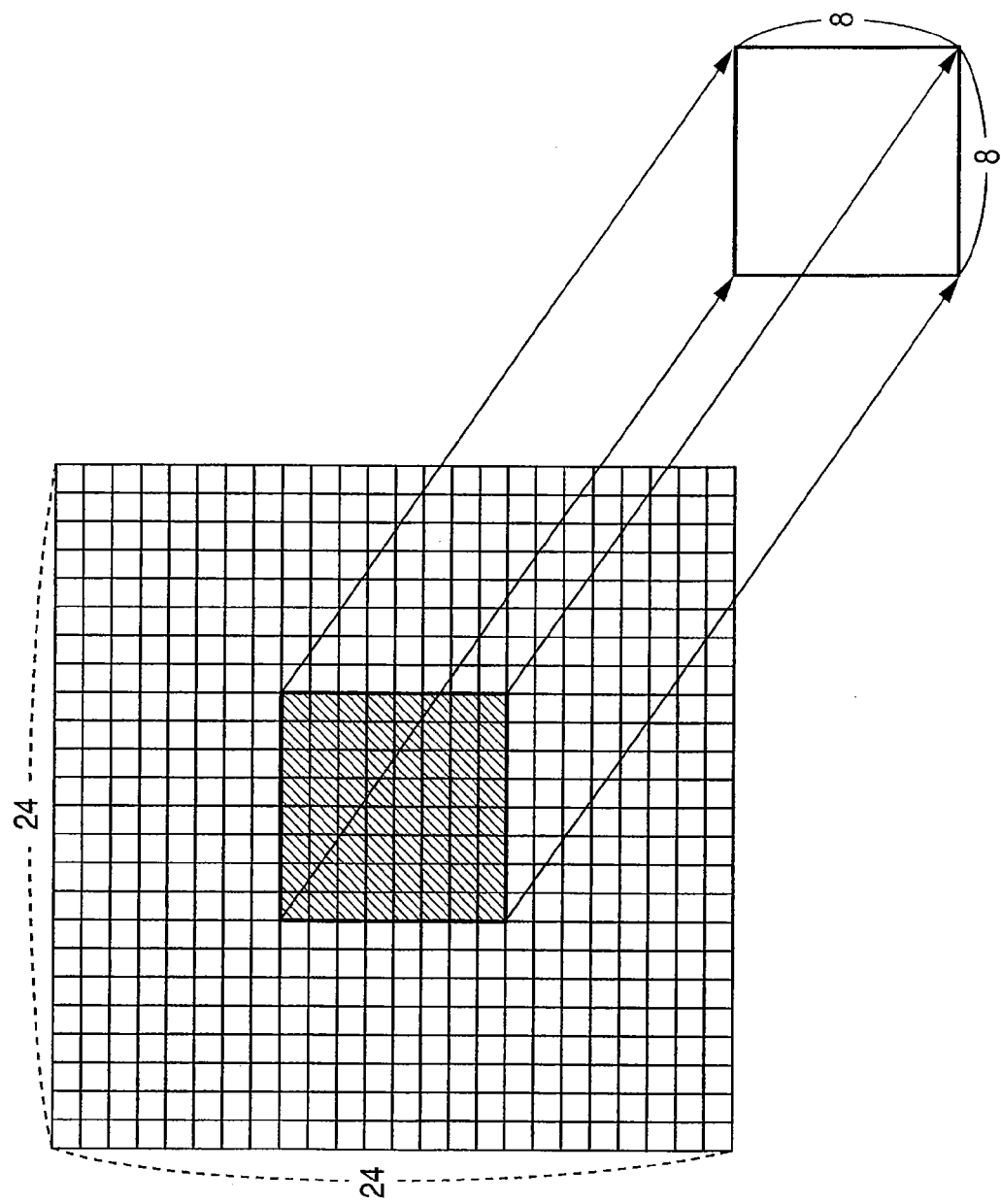
FIG. 8 is a schematic view showing pixels to be read in the third thinning read mode according to the embodiment of the present invention.
Figure 9:
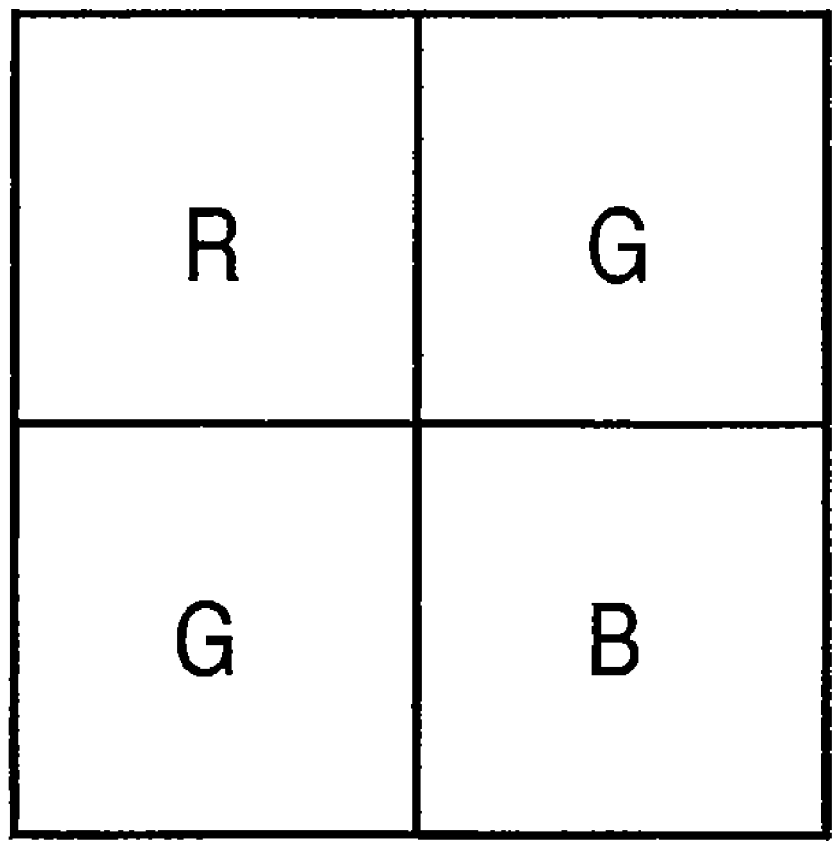
FIG. 9 is a view showing a Bayer array according to the embodiment of the present invention.

In the third thinning read mode, as shown in FIG. 8, horizontal 8 pixels and vertical 8 pixels are read at 1/3 the entire field angle in the vertical and horizontal directions. The field angle is 3.0×. All pixels within the read range are read, so the thinning ratio is 1 (thinning is not performed).

These thinning read modes define different field angles of pixel regions to be read but define the same total number of pixels to be read, so the frame read rate remains almost the same.

Normal moving image capturing is done in the first thinning read mode at a field angle of 1.0×. Upon receiving an instruction from the camera control unit 111, the image sensor driving unit 104 applies a driving pulse in the first thinning mode to the image sensor 102. The output of the image sensor 102 corresponds to a hatched region shown in FIG. 6. The digital process circuit 106 receives this output via the preprocess circuit 105. The digital process circuit 106 executes various kinds of digital signal processing including edge enhancement processing and white balance processing, and generates a display/record image. At this time, the input image is reduced/enlarged to have pixels in number suitable for display/record. The number of display/record pixels is 8 pixels in the horizontal direction and 8 pixels in the vertical direction in moving image capturing of this embodiment.

The moving image generated by the digital process circuit 106 is output to the LCD display 108 or written in the memory card 110 via the image conversion circuit 109.

A case in which the electronic zoom processing is done during moving image capturing will be explained. The electronic zoom processing is adopted when one wants to display/record an image while partially enlarging the field angle in normal moving image capturing. The electronic zoom processing is done in place of optical zoom or when a manual focus function is to be used.

The electronic zoom processing is performed by extracting pixels in a necessary region corresponding to the electronic zoom magnification from pixel data input to the digital process circuit 106 and displaying/recording the extracted pixels as horizontal 8 pixels×vertical 8 pixels.

Figure 10:
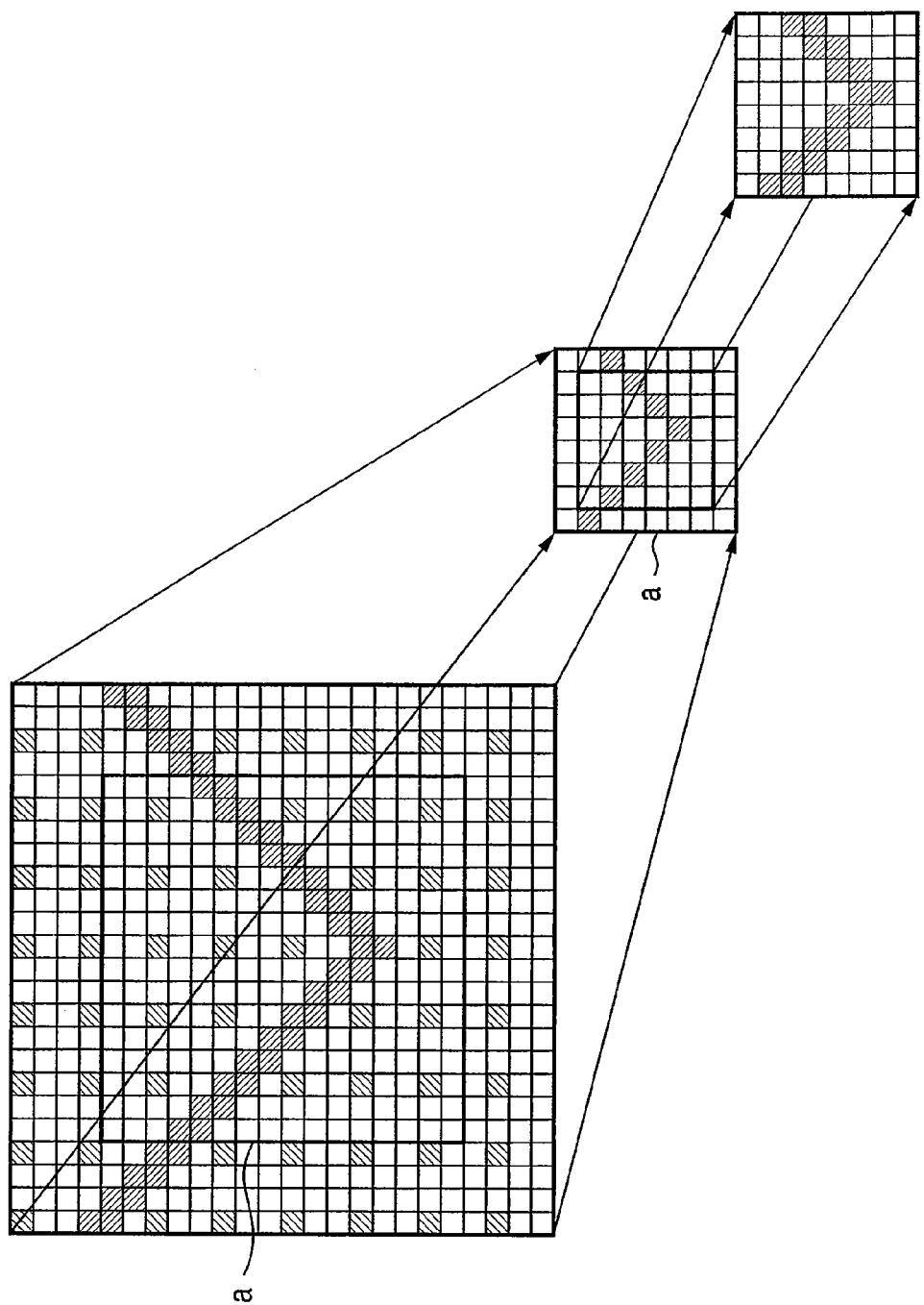
FIG. 10 is a view showing an extracted image and output image when the electronic zoom magnification is 1.5× according to a prior art.

FIG. 10 shows a prior art when the electronic zoom magnification is 1.5×. A frame a in FIG. 10 indicates the field angle when the electronic zoom magnification is 1.5×. An image having a small number of pixels undergoes so-called photographic enlargement processing to generate an output image, so deterioration in image quality is unavoidable. More specifically, during moving image capturing, 2/3 of horizontal 24 pixels×vertical 24 pixels in the left side view of FIG. 10 is thinned out to form horizontal 8 pixels×vertical 8 pixels, as shown in the middle view of FIG. 10. The field angle is 1.0×. In this state, the field angle is set to 1.5× by electronic zoom. As shown in the right side view of FIG. 10, horizontal 6 pixels×vertical 6 pixels are extracted from the horizontal 8 pixels×vertical 8 pixels shown in the middle view of FIG. 10, and the extracted 6 pixels×vertical 6 pixels are enlarged to form horizontal 8 pixels×vertical 8 pixels. The image obtained by electronic zoom has only information on horizontal 6 pixels×vertical 6 pixels, resulting in deterioration in image quality.

Figure 11:
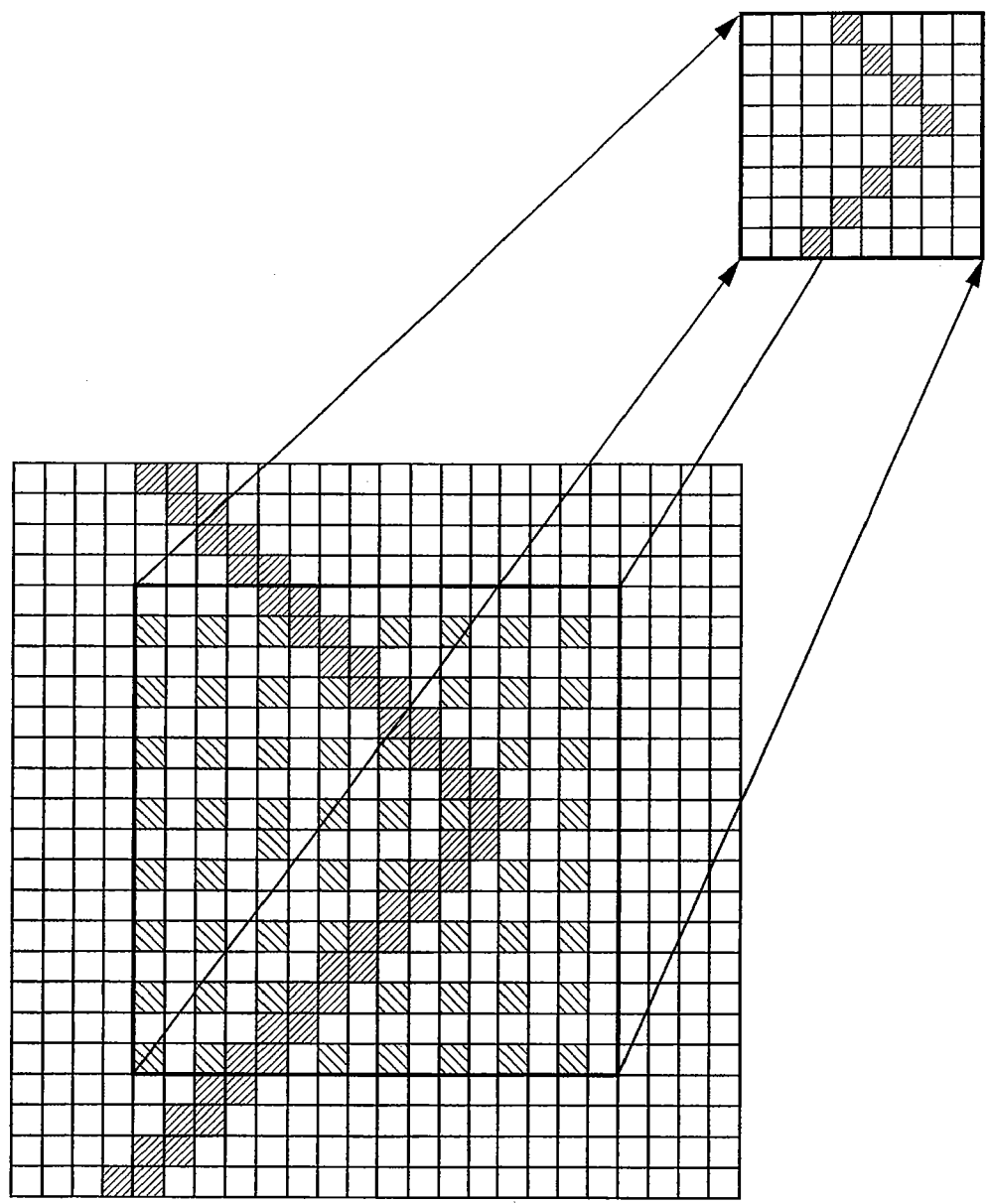
FIG. 11 is a view showing an extracted image and output image when the electronic zoom magnification is 1.5× in the second thinning read mode according to the embodiment of the present invention.

The digital camera according to this embodiment can change the read mode to the second thinning read mode during moving image capturing. When the electronic zoom magnification is 1.5×, pixels may be read out in the second thinning read mode to acquire an image having horizontal 8 pixels×vertical 8 pixels without enlarging the image, as shown in FIG. 11. It is therefore possible to capture an image at an optimized field angle and to obviate the need for change in frame rate because the number of pixels remains almost the same.

Figure 12:
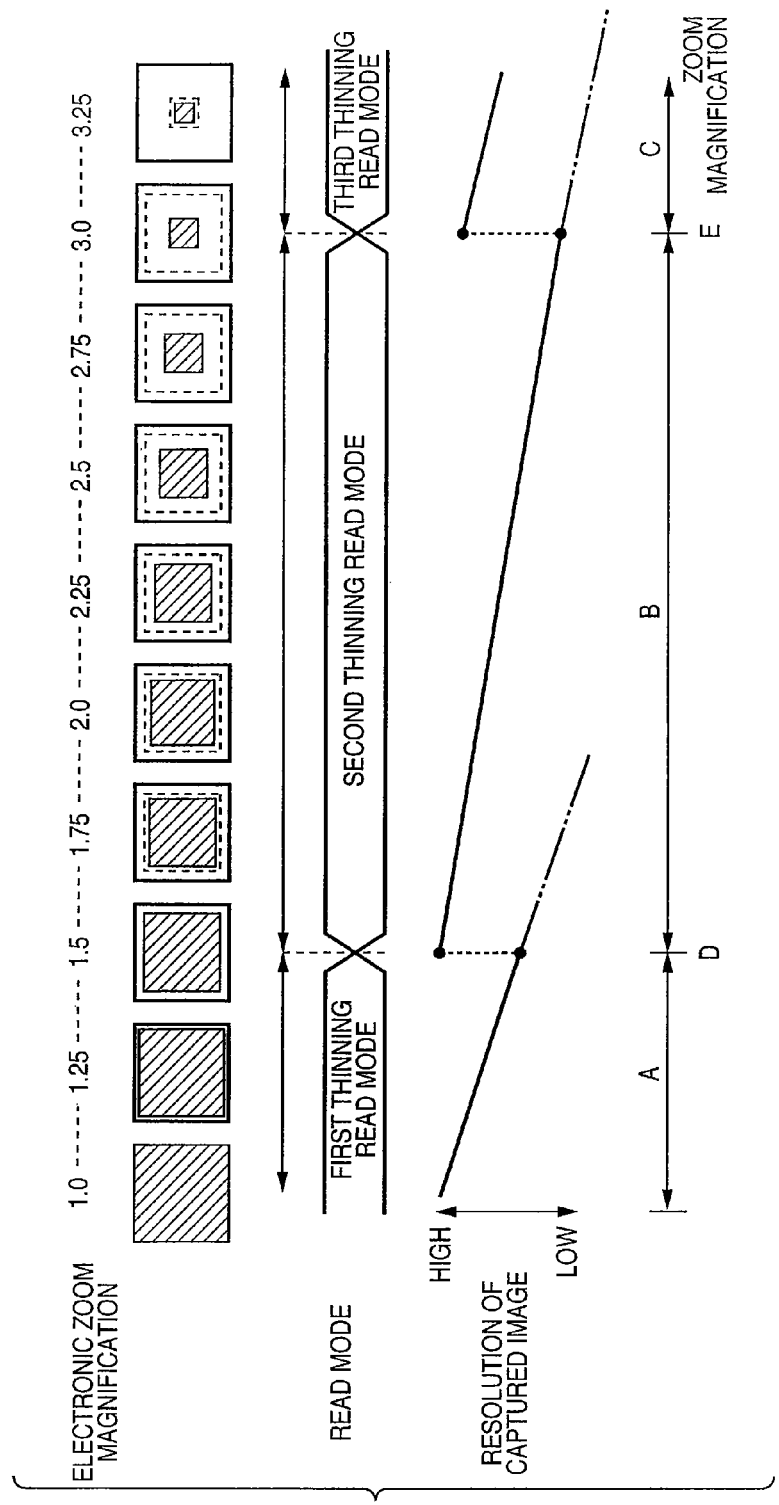
FIG. 12 is a view showing an example of the read mode and image resolution corresponding to the electronic zoom magnification according to the embodiment of the present invention.

To suppress deterioration in image quality upon electronic zoom, the digital camera according to this embodiment changes the read mode in accordance with the zoom magnification, as shown in FIG. 12. FIG. 12 shows the resolution of an image input to the digital process circuit 106, based on the number of pixels obtained for each field angle. FIG. 12 exemplifies a case in which the zoom magnification for switching a read mode is constant for descriptive convenience.

This will be explained in more detail.

An image signal is read out in the first thinning read mode when the electronic zoom magnification falls within the range of 1.0× to 1.5×. "RESOLUTION OF CAPTURED IMAGE" described in FIG. 12 expresses, using a curve, a change in resolution of an image input to the digital process circuit 106. Since this curve also serves as a line which indicates a switching position, it is called a switching diagram. When the electronic zoom magnification is 1.0×, no image resolution degradation occurs. As the electronic zoom magnification increases from 1.0×, the resolution of the image input to the digital process circuit 106 gradually degrades in accordance with the principle described with reference to FIG. 10 (a range A shown in FIG. 12). When the electronic zoom magnification becomes 1.5×, the thinning read mode is switched from the first thinning read mode to the second thinning read mode. The image input to the digital process circuit 106 returns to one free from any degradation in resolution again. As the electronic zoom magnification then further increases, the resolution of the image input to the digital process circuit 106 gradually degrades in the same manner as above (a range B shown in FIG. 12). When the electronic zoom magnification becomes 3.0×, the thinning read mode is switched from the second thinning read mode to the third thinning read mode. Also in this case, the image input to the digital process circuit 106 temporarily returns to one free from any degradation in resolution. As the electronic zoom magnification then increases, the resolution gradually degrades (a range C shown in FIG. 12).

When parameters for edge enhancement processing and the like in the digital process circuit 106 are assumed to be constant irrespective of thinning read mode switching, a moving image having a resolution which changes in the same manner as "RESOLUTION OF CAPTURED IMAGE" shown in FIG. 12 is displayed/recorded. The image quality greatly changes in accordance with read mode switching.

In view of this, the digital camera according to this embodiment is configured to avoid frequent changes in image quality due to read mode switching. More specifically, the zoom enlargement ratio for switching a read mode changes in accordance with whether electronic zoom operates toward the telephoto side or wide-angled side.

Figure 13:
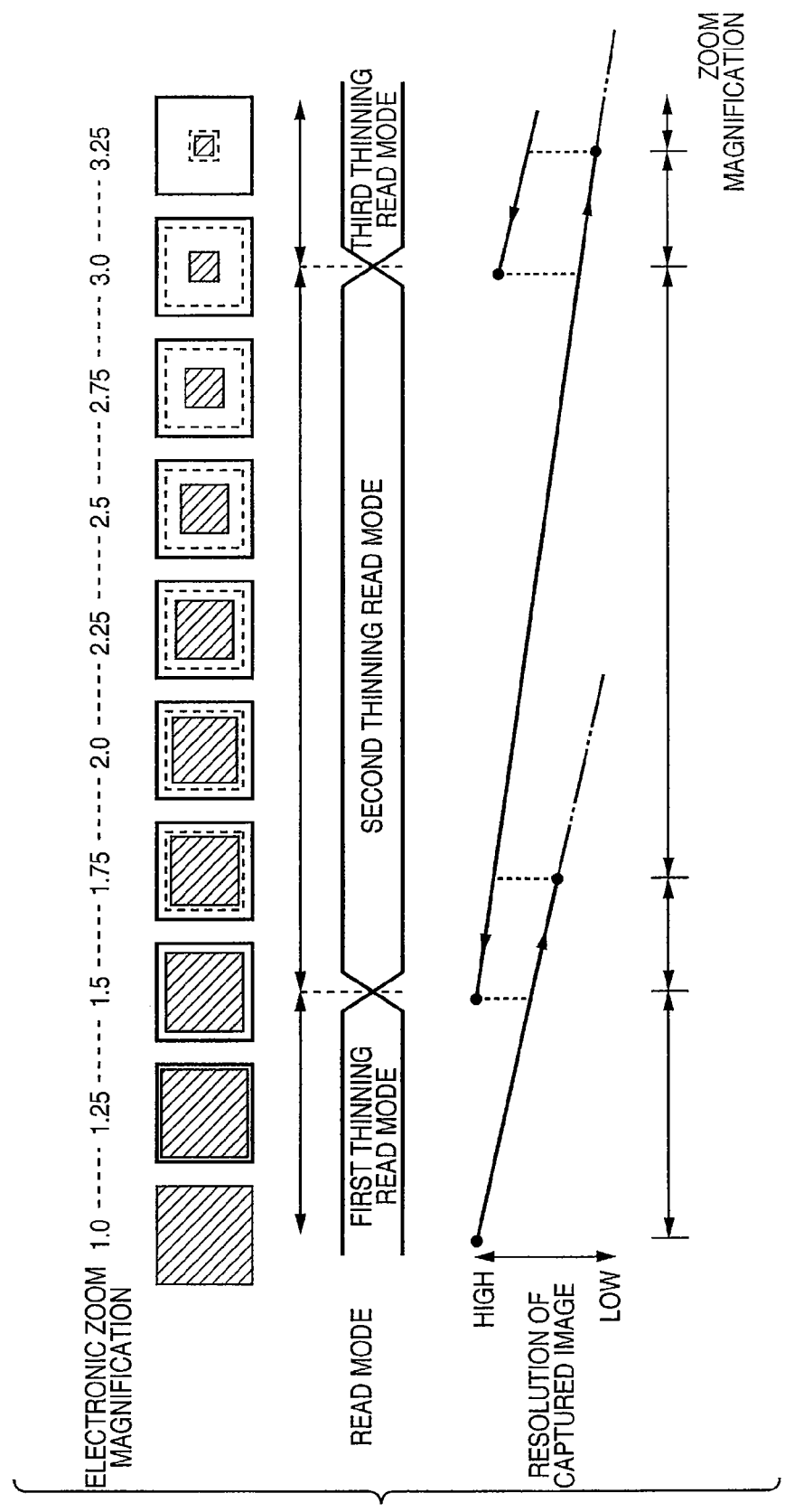
FIG. 13 is a view showing another example of the read mode and image resolution corresponding to the electronic zoom magnification according to the embodiment of the present invention.

In an example shown in FIG. 13, a position (timing) for switching a read mode changes in accordance with whether electronic zoom operates toward the telephoto side or wide-angled side, i.e., exhibits a so-called hysteresis characteristic. This prevents frequent switching of a read mode even when the zoom magnification frequently changes around a specific one.

This will be explained in more detail.

An image signal is read out in the first thinning read mode when electronic zoom operates toward the telephoto side while the electronic zoom magnification falls within a range of 1.0× to 1.75×. "RESOLUTION OF CAPTURED IMAGE" described in FIG. 13 expresses, using a curve, a change in resolution of an image input to the digital process circuit 106. When the electronic zoom magnification is 1.0×, no resolution degradation occurs. As the electronic zoom magnification increases from 1.0×, the resolution of the image gradually degrades. When the electronic zoom magnification becomes 1.75×, the read mode is switched from the first thinning read mode to the second thinning read mode. The image returns to one with little degradation in resolution again. When the electronic zoom magnification immediately changes to the wide angled side in accordance with the user's operation after the electronic zoom magnification exceeds 1.75×, the electronic zoom operates in the second thinning read mode in accordance with the switching diagram. The read mode is not switched until the electronic zoom magnification reaches 1.0×.

In the example shown in FIG. 12, when the zoom magnification for switching a read mode frequently changes between the telephoto/wide-angled sides, the read mode is frequently switched. This causes notable disturbance in quality of a captured image. However, the use of the arrangement as in the example shown in FIG. 13 makes it possible to suppress a change in image quality, thus suppressing any decrease in convenience for a user.

The same applies to another switching position and an operation toward the wide-angled side, and a description thereof will be omitted.

If a conventional electronic zoom technique is used without switching a thinning read mode unlike this embodiment, the resolution of a captured image linearly decreases as the electronic zoom magnification increases, as indicated by an alternate long and two short dashed line in FIG. 12 or 13. Adopting the method as in this embodiment makes it possible to minimize a decrease in resolution of a captured image.

Figure 14:
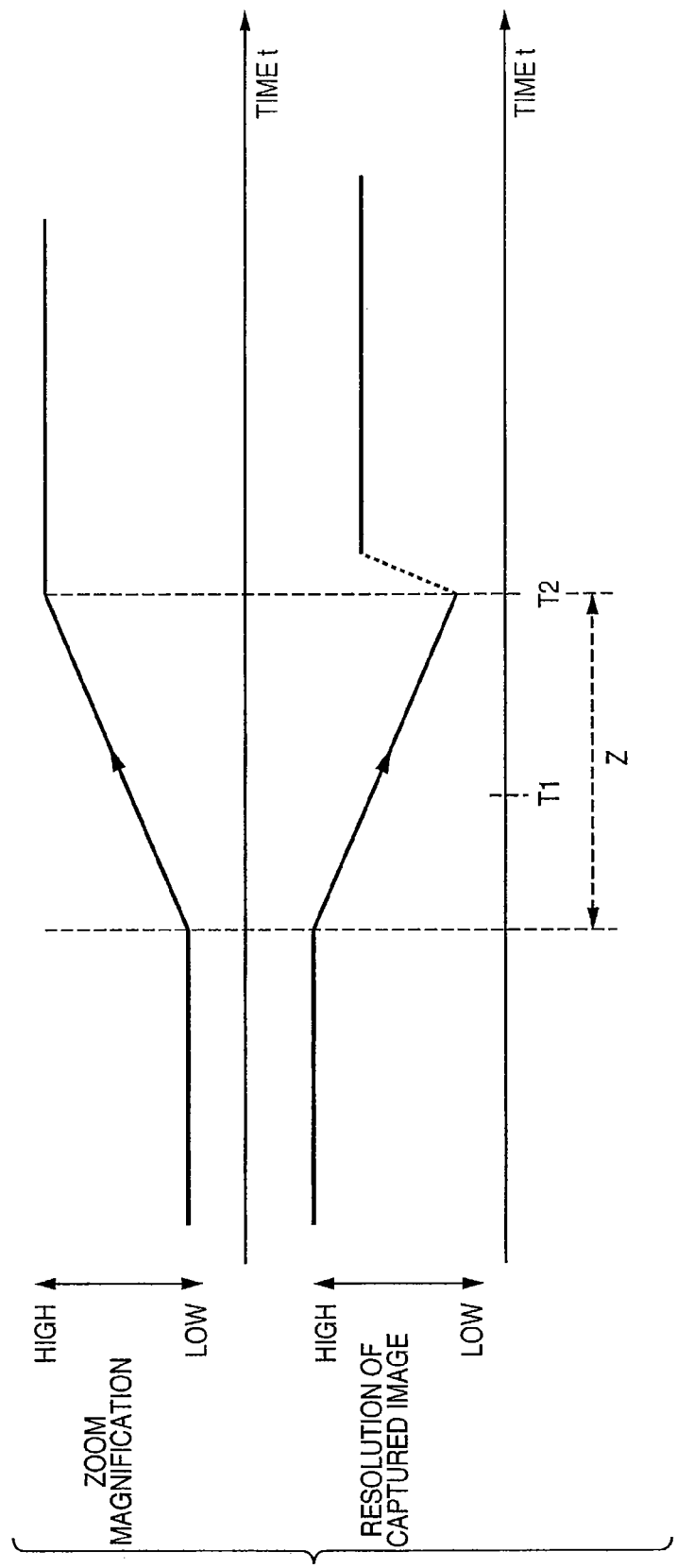
FIG. 14 is a graph showing an example of an electronic zoom magnification switching timing according to the embodiment of the present invention.

FIG. 14 is a graph showing another example of the read mode switching timing.

FIG. 13 has exemplified the case in which the read mode is switched in accordance with a switching diagram. Referring to FIG. 14, however, the read mode is not switched during a change in the zoom magnification even though the read mode switching timing is based on the switching diagram.

This will be explained in more detail.

FIG. 14 shows a change in resolution of a captured image on the time axis when electronic zoom operates toward the telephoto side. A range Z represents a period of time during which the zoom magnification changes. Assume that the electronic zoom has reached the read mode switching zoom position on the switching diagram en route to the telephoto side (T1). Since the zoom operation continues, the read mode is not switched at this point. After the stop of the zoom operation (a position T2 at the right end of the range Z), the read mode is switched to one corresponding to the zoom position at this point.

This allows the user's operation free from any troublesome change in image quality during a zoom operation. This also allows a reduction in load on the image capturing apparatus because magnification change processing and read mode switching processing in an electronic zoom operation are not executed simultaneously.

Figure 15:
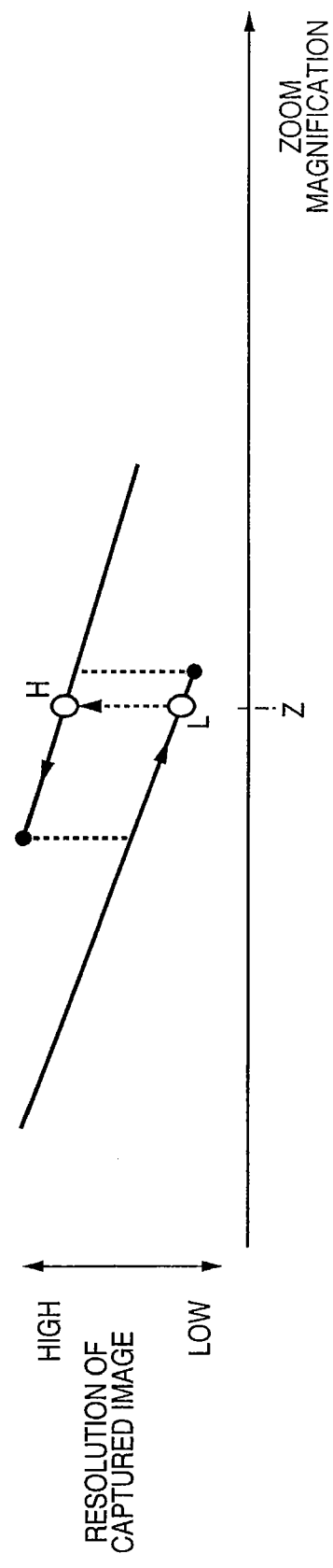
FIG. 15 is a graph showing an example of an electronic zoom magnification switching timing when capturing a still image according to the embodiment of the present invention.

FIG. 15 is a graph showing an operation for saving a moving image at a specific time as a still image.

At a release timing serving as a still image capturing sign, the read mode is switched to a high-resolution read mode irrespective of the position of electronic zoom on a switching diagram.

This will be explained in more detail.

FIG. 15 shows the switching diagram and the resolution of a captured image as in FIG. 13.

Assume, for example, that the user takes a picture with a zoom magnification Z during moving image capturing. The resolution is assumed to be kept low (L in FIG. 15). When the user releases the shutter at a timing to save a captured image as a still image, the read mode forcibly shifts to a read mode (H in FIG. 15) which attains higher resolution and image capturing is done.

This makes it possible to provide a still image with optimal resolution, such as a printout to be appreciated by the user.

As described above, according to this embodiment, the read method can be changed to suppress deterioration in image quality upon electronic zoom. It is also possible to generate a display/record image which saves the user's trouble of paying attention to the frequency of read mode switching.

A method of thinning out and reading out pixels on an image sensor to obtain a moving image has been mainly described in the above embodiment. However, the present invention is not limited to this, and is applicable to a case in which a plurality of pixels on an image sensor are added and read out to obtain a moving image.

It also suffices to read out pixels from an image sensor in a nonadditive manner in a read mode in which the read range is smallest.

That is, the first range in an image sensor is read out by adding or thinning out pixel signals to or from the first range. The second range narrower than the first range is read out in the following way. The second range has a smaller number of pixels than the first range because it is narrower than the first range. For this reason, the second range is read out in a nonadditive or non-thinning manner or by decreasing the thinning ratio of pixel signals or decreasing the number of pixel signals to be added to the second range as compared with the first range.

OTHER EMBODIMENT

The object of the embodiment is achieved even by the following method. That is, a storage medium (or recording medium) which records software program codes for implementing the functions of the above-described embodiment is supplied to the system or apparatus. The computer (or CPU or MPU) of the system or apparatus reads out and executes the program codes stored in the storage medium. In this case, the program codes read out from the storage medium implement the functions of the above-described embodiment by themselves, and the storage medium which stores the program codes constitutes the present invention. In addition to the case in which the functions of the above-described embodiment are implemented when the readout program codes are executed by the computer, the present invention incorporates the following case. That is, the functions of the above-described embodiment are implemented when the operating system (OS) running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiment are implemented when the CPU of the function expansion card or function expansion unit performs part or all of actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-037254, filed Feb. 14, 2006, which is hereby incorporated by reference herein in its entirety.

What is claimed is:

1. An image capturing apparatus which includes an electronic zoom function, comprising:
    an image sensor which photo-electrically converts an object image;
    a selection unit that selects between a first read mode in which information amount of pixel signals within a first area in said image sensor is read out by reducing the information amount at a first information reduction ratio, and a second read mode in which information amount of pixel signals within a second area in said image sensor, that is narrower than the first area, is read out without reducing the information amount or by reducing the information amount at a second information reduction ratio lower than the first information reduction ratio;
    a signal processing unit that generates a first image on the basis of pixel signals within a third area narrower than the first area of pixel signals within the first area read out in the first read mode, and generates a second image on the basis of pixel signals within the second area read out in the second read mode; and
    a control unit that controls said selection unit to select between the first read mode and the second read mode in accordance with an enlargement ratio of the electronic zoom,
    wherein said control unit controls to change, in accordance with whether the electronic zoom operates toward a telephoto side or wide-angled side, a zoom enlargement ratio for selecting a read mode by said selection unit.

2. The apparatus according to claim 1, wherein a frame read rate is substantially the same between the first read mode and the second read mode.

3. The apparatus according to claim 1, wherein said control unit does not change the read mode while the enlargement ratio of the electronic zoom changes to the telephoto side or wide-angled side, but changes the read mode after the change in enlargement ratio of the electronic zoom stops.

4. The apparatus according to claim 1, wherein when part of a moving image is to be saved as a still image, said control unit controls the read mode to a read mode in which an image is read out with higher resolution than in a read mode in which the moving image is read out.

5. A method of controlling an image capturing apparatus which includes an electronic zoom function, an image sensor which photo-electrically converts an object image, a selection unit that selects between a first read mode in which information amount of pixel signals within a first area in the image sensor is read out by reducing the information amount at a first information reduction ratio, and a second read mode in which information amount of pixel signals within a second area in the image sensor, that is narrower than the first area, is read out without reducing the information amount or by reducing the information amount at a second information reduction ratio lower than the first information reduction ratio, comprising:
    a signal processing step of generating a first image on the basis of pixel signals within a third area narrower than the first area of pixel signals within the first area read out in the first read mode, and generating a second image on the basis of pixel signals within the second area read out in the second read mode; and
    a control step of controlling the selection unit to select between the first read mode and the second read mode in accordance with an enlargement ratio of the electronic zoom,
    wherein in the control step, a zoom enlargement ratio for selecting a read mode by the selection unit is controlled to change in accordance with whether the electronic zoom operates toward a telephoto side or wide-angled side.

6. The method according to claim 5, wherein a frame read rate is substantially the same between the first read mode and the second read mode.

7. The method according to claim 5, wherein in the control step, the read mode is not changed while the enlargement ratio of the electronic zoom changes to the telephoto side or wide-angled side, but is changed after the change in enlargement ratio of the electronic zoom stops.

8. The method according to claim 5, wherein in the control step, when part of a moving image is to be saved as a still image, the read mode is selected to a read mode in which an image is read out with higher resolution than in a read mode in which the moving image is read out.

9. A program causing a computer to execute the method according to claim 5.

10. A computer readable storage medium storing the program according to claim 9.

* * * * *